United States Patent
Chae

(10) Patent No.: US 7,249,156 B2
(45) Date of Patent: Jul. 24, 2007

(54) METHOD OF PROVIDING A FILE TRANSFER SERVICE THROUGH A MOBILE COMMUNICATION NETWORK

(75) Inventor: Yi Sik Chae, Goyang-si (KR)

(73) Assignee: LG Electronics Inc., Seoul (KR)

( * ) Notice: Subject to any disclaimer, the term of this patent is extended or adjusted under 35 U.S.C. 154(b) by 588 days.

(21) Appl. No.: 10/003,344

(22) Filed: Dec. 6, 2001

(65) Prior Publication Data

US 2002/0073140 A1 Jun. 13, 2002

(30) Foreign Application Priority Data

Dec. 7, 2000 (KR) .................. 2000-74366
Dec. 7, 2000 (KR) .................. 2000-74368

(51) Int. Cl.
*G06F 15/16* (2006.01)

(52) U.S. Cl. .............. 709/203; 709/233; 709/212; 455/428; 455/426

(58) Field of Classification Search .......... 709/203, 709/206, 212, 229, 250, 201, 223, 226, 233; 713/210; 455/405, 426, 557, 517, 70, 437, 455/414, 436, 428; 348/143; 340/905

See application file for complete search history.

(56) References Cited

U.S. PATENT DOCUMENTS

| | | | | |
|---|---|---|---|---|
| 5,606,674 A | * | 2/1997 | Root ........................ | 715/769 |
| 5,638,521 A | * | 6/1997 | Buchala et al. ............. | 710/316 |
| 5,729,717 A | * | 3/1998 | Tamada et al. ............. | 711/164 |
| 5,745,758 A | * | 4/1998 | Shaw et al. ................ | 718/102 |
| 5,838,904 A | * | 11/1998 | Rostoker et al. ........... | 709/250 |
| 5,878,344 A | * | 3/1999 | Zicker ...................... | 455/426.1 |
| 5,881,231 A | * | 3/1999 | Takagi et al. .............. | 709/212 |
| 5,886,981 A | * | 3/1999 | Kamiya ..................... | 370/230 |
| 5,913,028 A | * | 6/1999 | Wang et al. ................ | 709/203 |
| 5,913,041 A | * | 6/1999 | Ramanathan et al. ....... | 709/233 |
| 5,914,796 A | * | 6/1999 | Selin ......................... | 398/118 |
| 5,974,393 A | * | 10/1999 | McCullough et al. ....... | 705/8 |
| 6,031,832 A | * | 2/2000 | Turina ...................... | 370/348 |
| 6,058,307 A | * | 5/2000 | Garner ...................... | 455/428 |
| 6,105,064 A | * | 8/2000 | Davis et al. ................ | 709/224 |
| 6,130,626 A | * | 10/2000 | Kane et al. ................. | 340/905 |

(Continued)

OTHER PUBLICATIONS

Two-stage Preconditions for Inexact Newton Methods in..—Klie, Rame, Wheeler (1996) softlib.rice.edu/pub/CRPC-TRs/reports/CRPC-TR96660.ps.gz.*

(Continued)

*Primary Examiner*—Thong Vu
(74) *Attorney, Agent, or Firm*—Ked & Associates, LLP

(57) ABSTRACT

A method is provided for determining whether to transfer an audio, video, or text data file, requested to be transferred through a mobile station, based on a specified transfer condition and/or file size, and transferring the data file to a destined mobile terminal connected through a mobile communication network. The method stores a data file and transfer conditioning information thereof, which contains information on file size and/or transfer blocking time zone and a destination terminal, received from a calling mobile terminal connected through the mobile communication network, selects a data file to transfer and determines whether to transfer the selected data file based on the transfer conditioning information, and transmits the selected data file to a called mobile terminal specified as destination by the transfer conditioning information.

19 Claims, 4 Drawing Sheets

U.S. PATENT DOCUMENTS

| | | | |
|---|---|---|---|
| 6,137,804 A * | 10/2000 | Allison et al. | 370/410 |
| 6,145,083 A * | 11/2000 | Shaffer et al. | 713/201 |
| 6,154,767 A * | 11/2000 | Altschuler et al. | 709/203 |
| 6,205,143 B1 * | 3/2001 | Lemieux | 370/395.61 |
| 6,243,755 B1 * | 6/2001 | Takagi et al. | 709/229 |
| 6,275,702 B1 * | 8/2001 | Peltonen | 455/436 |
| 6,349,297 B1 * | 2/2002 | Shaw et al. | 707/4 |
| 6,460,073 B1 * | 10/2002 | Asakura | 709/206 |
| 6,483,820 B1 * | 11/2002 | Davidson et al. | 370/329 |
| 6,564,047 B1 * | 5/2003 | Steele et al. | 455/405 |
| 6,654,603 B1 * | 11/2003 | Chow et al. | 455/414.1 |
| 6,690,948 B1 * | 2/2004 | Takiguchi et al. | 455/557 |
| 6,694,147 B1 * | 2/2004 | Viswanath et al. | 455/517 |
| 6,697,103 B1 * | 2/2004 | Fernandez et al. | 348/143 |
| 6,816,904 B1 * | 11/2004 | Ludwig et al. | 709/226 |
| 6,842,768 B1 * | 1/2005 | Shaffer et al. | 709/203 |
| 6,857,016 B1 * | 2/2005 | Motoyama et al. | 709/224 |
| 6,874,099 B1 * | 3/2005 | Balasubramanian et al. | 714/4 |
| 6,904,089 B1 * | 6/2005 | Sueyoshi et al. | 375/240 |
| 7,031,665 B1 * | 4/2006 | Trell | 455/70 |
| 7,106,843 B1 * | 9/2006 | Gainsboro et al. | 379/191 |
| 2002/0068569 A1 * | 6/2002 | Chen et al. | 455/437 |
| 2002/0107903 A1 * | 8/2002 | Richter et al. | 709/201 |
| 2002/0116500 A1 * | 8/2002 | Arora et al. | 709/227 |
| 2002/0129375 A1 * | 9/2002 | Kim et al. | 725/100 |
| 2002/0155831 A1 * | 10/2002 | Fodor et al. | 455/426 |
| 2002/0163933 A1 * | 11/2002 | Benveniste | 370/465 |
| 2003/0041110 A1 * | 2/2003 | Wenocur et al. | 709/206 |
| 2003/0110503 A1 * | 6/2003 | Perkes | 725/86 |
| 2005/0207388 A1 * | 9/2005 | Rinne et al. | 370/347 |

OTHER PUBLICATIONS

High-Performance Incremental Scheduling on Massively Parallel..—Min-You Wu (1995) www.cs.buffalo.edu/pub/WWW/faculty/shu/../shu/psfile/rips.sc95.ps.*

Modelling Space for—Location-Dependent Tasks Why (1997) salber.online.fr/publications/chi1997workshop.pdf.*

Wireless intelligent ATM network and protocol design for future personal communication systems IEEE Journal on vol. 15, Issue 7, Sep. 1997 pp. 1289-1307 Digital Object Identifier 10.1109/49.622912.*

SWAN: a mobile multimedia wireless network; Personal Communications, IEEE [see also IEEE Wireless Communications] vol. 3, Issue 2, Apr. 1996 pp. 18-33 Digital Object Identifier 10.1109/98.490750.*

Advances in wireless terminals ; Lettieri, P.; Srivastava, M.B.; Personal Communications, IEEE [see also IEEE Wireless Communications] vol. 6, Issue 1, Feb. 1999 pp. 6-19 Digital Object Identifier 10.1109/98.752784.*

* cited by examiner

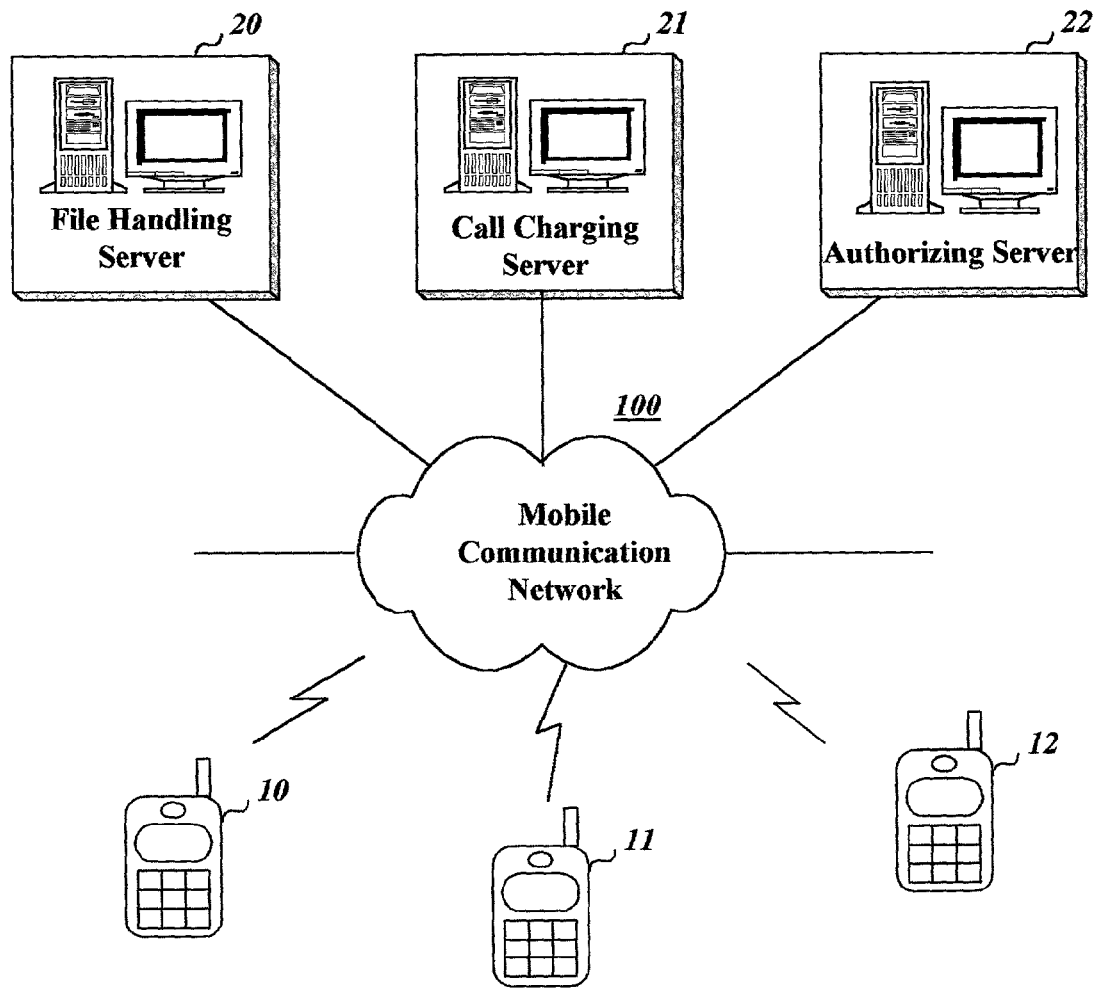

METHOD OF PROVIDING A FILE TRANSFER SERVICE THROUGH A MOBILE COMMUNICATION NETWORK

BACKGROUND OF THE INVENTION

1. Field of the Invention

The present invention relates to a method of providing a file transfer service through a mobile communication network, and more particularly, to a method of determining whether to transfer a data file including audio, moving-picture, or text contents, requested to be transferred through a mobile station, based on a specified transfer condition and/or file size, and transferring a data file to a destination mobile terminal connected through a mobile communication network.

2. Description of the Related Art

In general, a telephone is a very popular communication tool, which enables voice communication between two speaking parties, and it is classified into two types, one is a wired telephone for a public switched telephone network (PSTN) and the other is a mobile station for a wireless communication network. A mobile station provides a person with mobility which ensures data/voice communication anywhere.

Lately, a next-generation mobile communication network is being introduced according to a remarkable development of mobile communication technology. The next-generation mobile communication network such as IMT-2000 (International Mobile Telecommunication for the 2000s) or FPLMTS (Future Public Land Mobile Telecommunication System) is expected to be commercialized sooner or later. The next-generation mobile communication network adopts a packet switched method for sending/receiving audio, moving-picture, or data file at high speed, and it also uses a high frequency band, e.g., 1,885 MHz~2,110 MHz or 2,110 MHz~2,200 MHz to ensure higher data transmission rate.

Therefore, the next-generation mobile communication network can provide a high-quality communication service, namely, high-speed data transmission and highly-reliable data delivery for video or text data file as well as conventional voice conversation, furthermore, it can provide various supplementary services.

However, a mobile station has too small a storage capacity to store a large-sized data file when it receives or sends, and a service charge of wireless data communication is relatively higher than that of wired communication as well, so that a service use cost would be increased greatly if a lot of data are transferred through a mobile communication network.

SUMMARY OF THE INVENTION

It is an object to provide a method of transferring a data file through a mobile communication network, which transfers a data file to a terminal other than a target mobile station based on a file size and/or file type, and guarantees data file transfer to be conducted out of a time zone of high service charge where the time zone is set by a user.

A method of providing a file transfer service through a mobile communication network according to the present invention, stores a data file and transfer conditioning information thereof received from a first mobile terminal connected through the mobile communication network, transmits information for transferring the data file through the mobile communication network based on the stored transfer conditioning information, and transfers the data file to a second mobile terminal answering to said information for transferring the data file if response information from the second mobile terminal is matched with the transfer conditioning information.

Another method of providing a file transfer service through a mobile communication network according to the present invention, stores a data file and transfer blocking time zone information thereof received from a first mobile terminal connected through the mobile communication network, selects one among the stored data files based on the stored transfer blocking time zone information, and transfers the selected data file to a second mobile terminal specified as destination of the selected file avoiding the corresponding transfer blocking time zone.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 1 is an illustrative network to which a file transferring method according to the present invention is applied;

FIG. 2 shows an example of transfer conditioning information stored in a file handling server according to the present invention;

DETAILED DESCRIPTION OF THE PREFERRED EMBODIMENT

Figure 3:
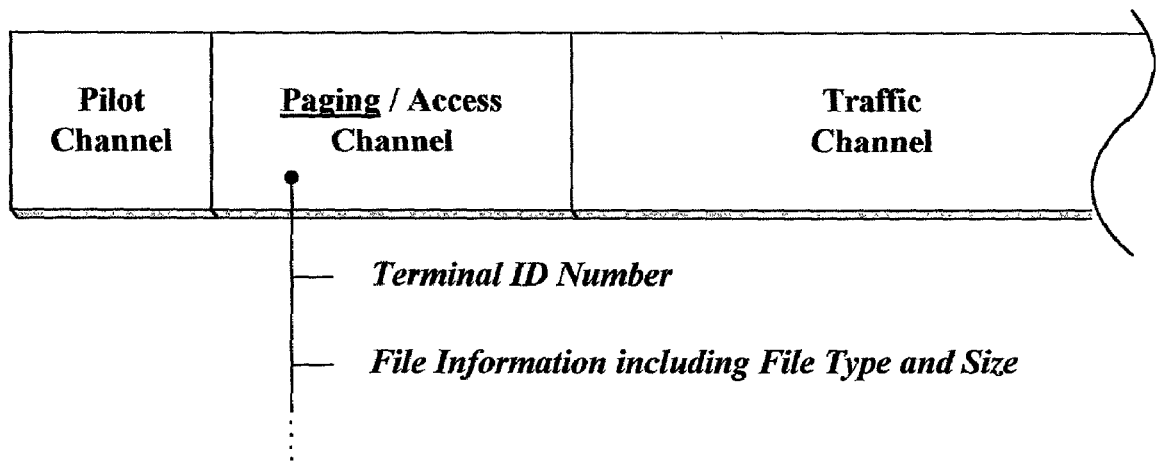
FIG. 3 shows an example of a calling signal carried through a paging channel of a wireless signal.

In order that the invention may be fully understood, a preferred embodiment thereof will now be described with reference to the accompanying drawings.

FIG. 1 is an illustrative network to which a file transferring method according to the present invention is applied. The illustrative network of FIG. 1 comprises a plurality of mobile stations (MSs) 10, 11, 12, . . . ; a file handling server 20 for storing both data files to be communicated with the plurality of the MSs and all transfer conditioning information thereof; a call charging server 21 for charging for file transfer and voice conversation and storing charge information; and an authorizing server 22 for authorizing a subscriber with pre-stored subscriber authentication information.

FIG. 2 shows an example of the transfer conditioning information to be stored in the file handling server 20 according to the present invention. The transfer conditioning information includes a code number of an audio, video, or text file specified to be transferred by a subscriber; terminal identification number (TIN), e.g., ESN (Electronic Serial Number) or telephone number of an originating MS initiating a file transfer service; TIN of a destined MS to receive a data file; file transfer blocking time zone set by a subscriber; and file type and size. The file transfer blocking time zone is preferably set by a subscriber to a time zone when traffic is thought to be much congested or a charge per unit time is relatively high.

If a subscriber carrying a MS 10 wants to transfer a certain audio, video or text file to a target MS 11, he or she tries to make connection to the file handling server 20 through a mobile communication network 100 with his or her MS 10, first. Then, he or she selects a desired file stored in the file handling server 20 or uploads a data file to transfer to the file handling server 20 through the MS 10.

After that, a TIN of the destination MS 11 and the file transfer blocking time zone are uploaded or entered from the originating MS 10, and are stored in the file handling server 20. A TIN of the originating MS 10 may be automatically provided for the file handling server 20 from the mobile communication network if not provided from the MS 10, and a telephone number, if provided instead of ESN, can be replaced to corresponding ESN.

The file handling server 20 will charge differently for each data file transfer service according to the set file transfer blocking time zone, therefore, a subscriber can reduce a data transfer service using cost by setting the file transfer blocking time zone to a heavy traffic time zone which usually has high-rate charging scheme.

The file handling server 20 stores, as shown in FIG. 2, the information, received from input and selection through the originating MS 10, as the transfer conditioning information which is used to determine transfer of a file. The file handling server 20 examines all stored file transfer blocking time zones included in the transfer conditioning information to determine which file is to be transferred earliest of all.

Namely, the file handling server 20 searches the stored file transfer blocking time zones set by many subscribers for one time zone which is closest to a current time. If one is selected, the file handling server 20 reads a TIN stored in connection with the selected time zone, and tries to make connection to the MS 11 of the read TIN addresses. To make a connection, a calling signal is carried by a paging channel with a TIN of the called MS 11 and information on a file to transfer as shown in FIG. 3 where the file information includes file type and size.

Figure 4:
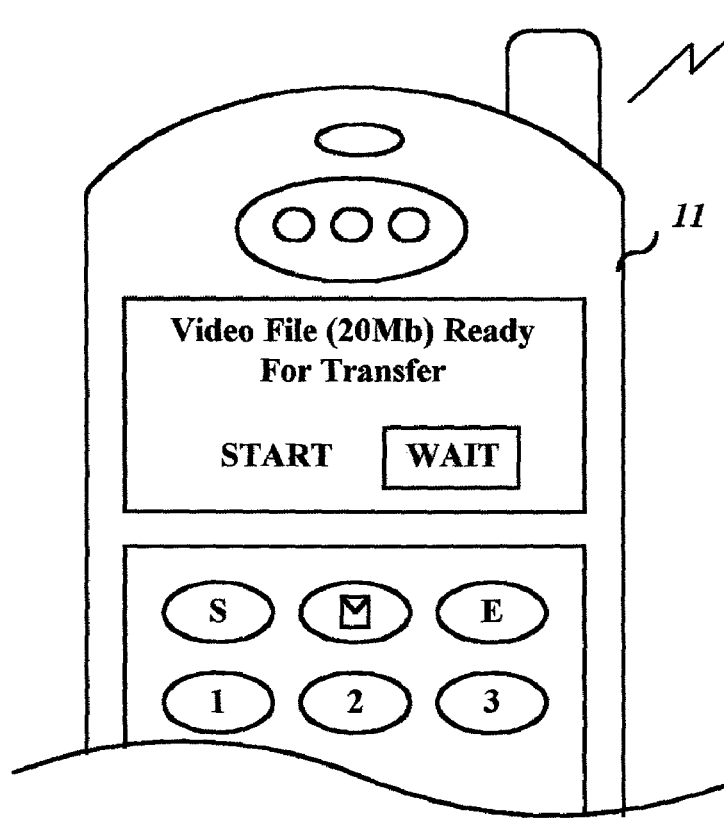
FIG. 4 is an illustrative LCD screen showing that a file transfer is ready.

Accordingly, the called MS 11 identifies its own TIN carried in the paging channel, and then extracts the file information in the paging channel and displays 'file transfer ready' on its LCD as shown in FIG. 4 together with file type (or attribute) and size contained in the extracted file information. A person carrying the called MS 11, therefore, knows with ease that a data file is to be downloaded to him or her now.

The person having acknowledged 'file transfer ready' will select 'start file transfer' or 'suspend file transfer' based on the file type and/or size displayed on the LCD of the MS 11. Namely, if the file to be downloaded is a small-sized audio or text file, the called person is likely to select 'start file transfer' to request immediate file download, however if the file is large-sized moving-picture one, he or she will select 'suspend file transfer' to put the file download on hold.

Figure 5:
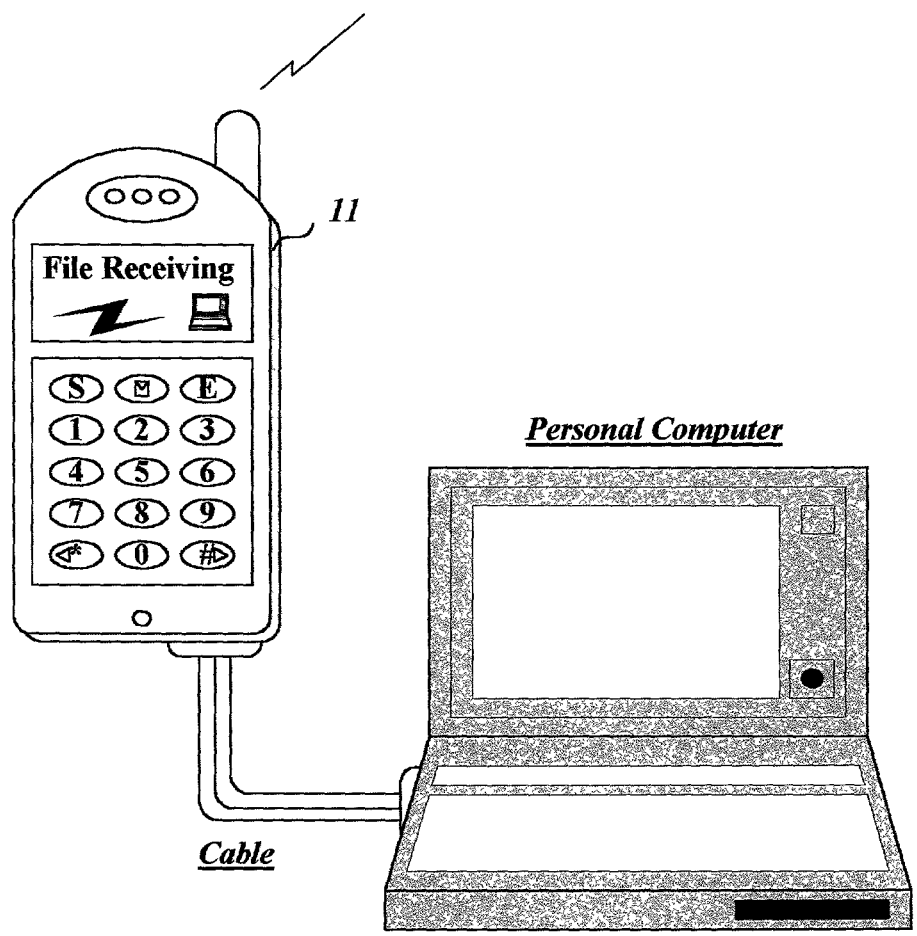
FIG. 5 shows a mobile station connected to a personal computer to receive a large-sized data file.
Figure 6:
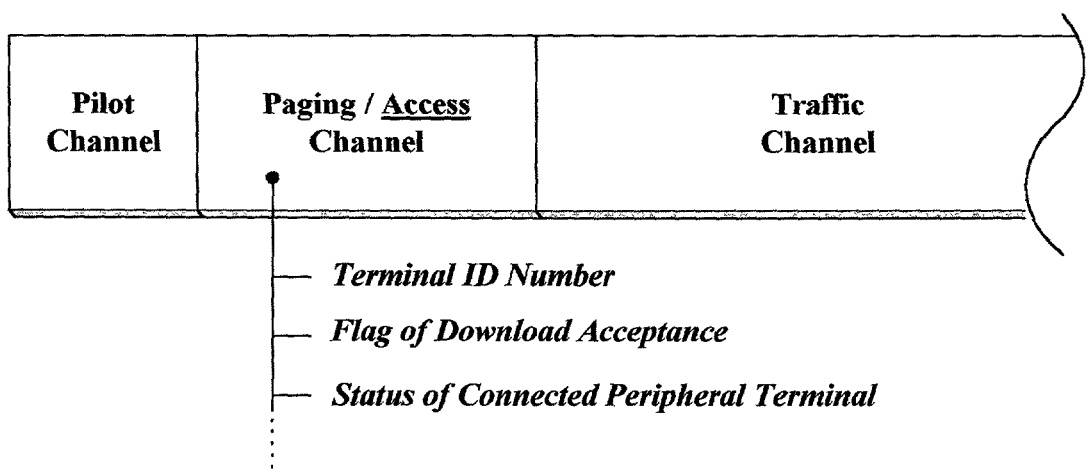
FIG. 6 shows an example of an answering signal carried through an accessing channel of a wireless signal.

In the condition that file transfer is suspended, if a large-storage peripheral device such as a personal computer is connected to the called MS 11 as shown in FIG. 5, the called MS 11 sends its own TIN, a terminal status of the connected device, and a download accepting signal through an accessing channel of wireless signals after receiving the terminal status. The terminal status contains information on a spare storage capacity of the connected device and it is entered by the called person or is provided automatically from the peripheral device as soon as the called MS 11 is connected to the device.

Figure 7:
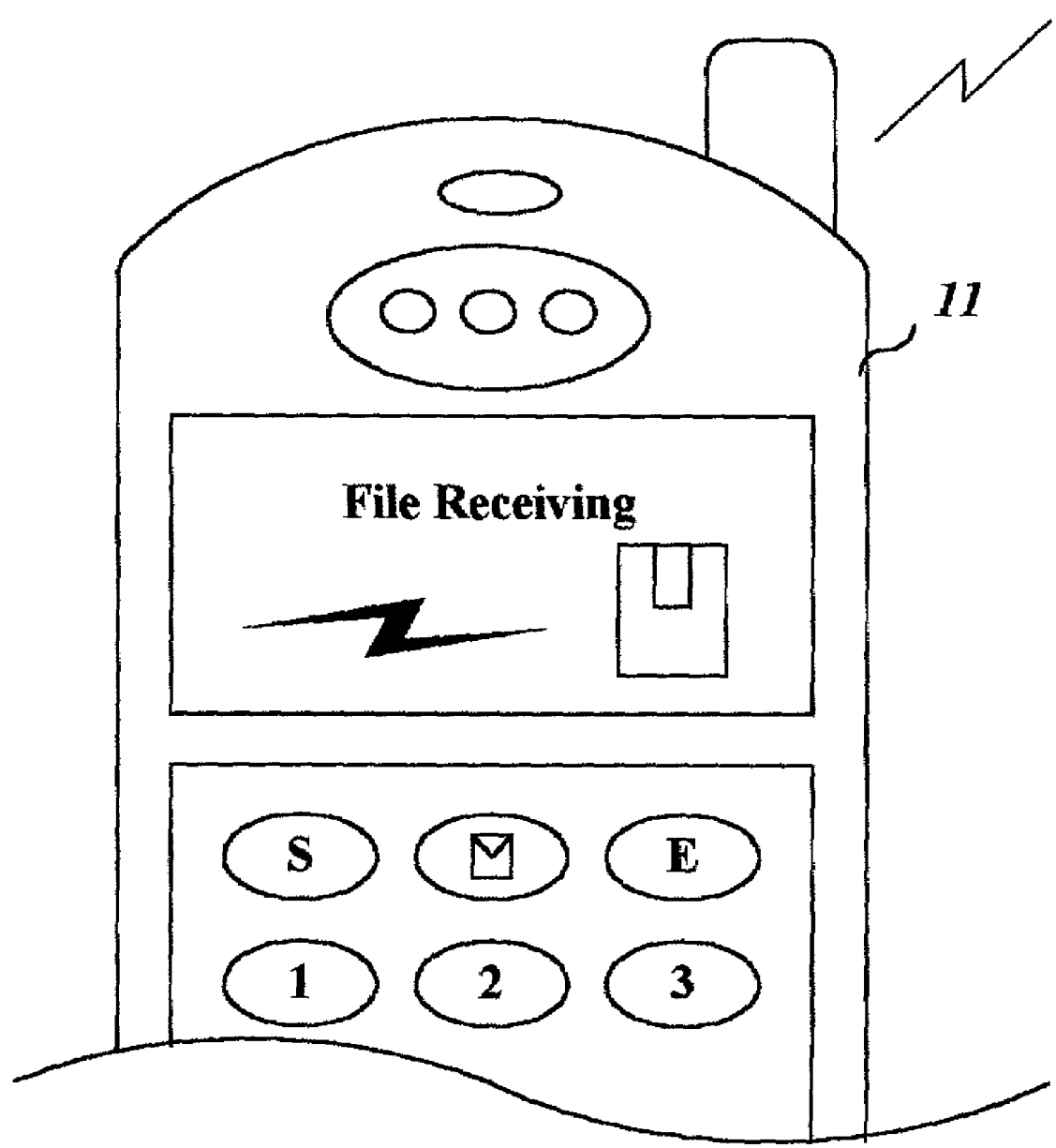
FIG. 7 is an illustrative LCD screen showing that a data file is being received according to the present invention.

Then, the file handling server 20 receives all the information sent from the called MS 11 through the mobile communication network 100, identifies, based on a TIN contained in the received information, which file the received information is about, and checks the type and size of the identified file to know whether the spare storage capacity of the connected peripheral device is sufficient for the file to transfer. If the spare storage capacity is not enough to store the file, the file handling server 20 sends a message notifying of possible download fail, otherwise, it immediately starts download of the file and, at the same time, sends a message indicative of 'download being processed' which will be displayed on an LCD of the called MS 11 like as in FIG. 7.

When the data file is downloaded, the called MS 11 stores it in an internal memory or delivers it to the connected external device to store it in a large-capacity storage medium of the external device, based on size of the received data file. After the file download is done, the file handling server 20 sends to the originating MS 10 a message advising that the requested file transfer has been accomplished. This message is also displayed on an LCD of the originating MS 10.

In addition, the file handling server 20 provides necessary information for charging for the file transfer for the call charging server 21 which charges for the file transfer based time difference between corresponding file transfer blocking time zone and actual file transferred time which are contained in the necessary information provided from the file handling server 20.

In other words, the call charging server 21 charges for the file transfer in reverse proportion to the time difference. Namely, if the time difference is large the file transfer service is charged low as much. Therefore, the service charge for file transfers accomplished at same time would be different if corresponding file transfer blocking time zones are not equal.

If a call connection to the target MS 11 is failed due to a power-off of the MS 11 or pre-occupancy of all links of a cell where the MS 11 is located, the file handling server 20 searches for next file transfer blocking time zone which is secondly closest to the current time, and reads a TIN stored in connection with the found time zone, and tries to make connection to a certain MS the read TIN addresses. If connection is made to the MS, the above-explained file transfer service is conducted.

In the meantime, when a file transfer is requested to the file handling server 20 from the originating MS 10, the file handling server 20 may send a subscriber authentication requesting signal to the authorizing server 22 together with the TIN of the MS 10. Then, the authorizing server 22 acknowledging the requesting signal from the file handling server 20 sends to the originating MS 10 a message requesting a unique subscriber's number and password which is displayed on an LCD of the MS 10. After that, if subscriber's number and password are received the authorizing server 22 determines based on validity of them whether or not a person carrying the MS 10 is entitled to use file transfer service.

If authentication of a person who owns the called MS 11 is required too, the file handling server 20 also transmits a subscriber authentication requesting signal to the authorizing server 22 together with TIN of the called MS 11. Then, the authorizing server 22 sends to the destination MS 11 a message requesting unique subscriber's number and password which is displayed on an LCD of the MS 11. After that, if subscriber's number and password are received the authorizing server 22 determines based on validity of them whether or not a person carrying the MS 11 is entitled to receive a file to be downloaded by a file transfer service. If he or she is entitled to, the file handling server 20 starts to download a data file selected or uploaded from the originating MS 10.

The file handling server 20 may be integrated into a mobile switching center (MSC) conducting call processing and data switching operation instead of a separate single system which is connected to MSCs to provide additional file transfer service as explained above.

The method of providing a file transfer service through a mobile communication network according to the present invention, enables a subscriber to transfer a data file to a mobile terminal located anywhere through a mobile communication network avoiding a highly-charging time zone, and also prevents in advance a file transfer fail which might be caused from insufficient storage capacity of a receiving mobile terminal for a large-sized data file to transfer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of providing a file transfer service through a mobile communication network, comprising:
   storing a data file and transfer conditioning information at a server, the data file and the transfer conditioning information having been received from a first mobile terminal connected through the mobile communication network;
   transmitting information from the server, the information for transferring the data file through the mobile communication network being based on the stored transfer conditioning information;
   checking response information sent from a second mobile terminal answering to said information for transferring the data file; and
   transferring the data file from the server to the second mobile terminal based on the checked response information, wherein said transfer conditioning information includes a blocking time period set in the first mobile terminal by a user of when to block a file transfer from the server to the second mobile terminal.

2. The method set forth in claim 1, wherein said transfer conditioning information further includes identification information of the first and the second mobile terminals, and size information of the data file to transfer.

3. The method set forth in claim 2, wherein said information for transferring the data file includes size information of the data file to transfer.

4. The method set forth in claim 3, wherein said information for transferring the data file further includes type information of the data file to transfer.

5. The method set forth in claim 1, wherein said response information includes spare storage capacity information of a peripheral device connected to the second mobile terminal.

6. The method set forth in claim 1, wherein said checking determines whether or not to transmit the data file based on the response information and the stored transfer conditioning information.

7. A method of providing a file transfer service through a mobile communication network, comprising:
   storing, at a server, a data file and transfer conditioning information thereof received from a first mobile terminal connected through the mobile communication network;
   selecting one among the stored data files based on the stored transfer conditioning information; and
   transferring the selected data file from the server to a second mobile terminal specified as a destination of the selected file, wherein the transfer conditioning information includes information of a blocking time period set by a user of when to block a file transfer, and wherein said selecting includes selecting one data file whose transfer blocking time period is closest to a current time.

8. The method set forth in claim 7, wherein said blocking time period is set to a time period when voice traffic is normally congested.

9. The method set forth in claim 7, wherein said transferring includes transmitting another data file selected next based on the transfer conditioning information from the server to a third mobile terminal specified as a destination of the next selected file, if trials of making connection to the second mobile terminal fail.

10. A file transfer method, comprising:
    setting a blocking time period at a first mobile terminal during which a file transfer is to be blocked;
    selecting a file to transfer from a file handling server to a second mobile terminal;
    receiving by the second mobile terminal, a display message indicating the file selected by the first mobile terminal is ready for transfer at a time not within the set blocking time period, said display message also including a size of the file to be transferred; and
    delaying the file transfer from the file handling server until the second mobile terminal is connected to an external apparatus having a sufficient memory capacity to store the size of the file to be transferred.

11. The method set forth in claim 10, wherein the file handling server stores a plurality of other files to be transferred by other mobile terminals.

12. The method set forth in claim 11, wherein the file handling server first transfers a file whose blocking time period is closest to a current time.

13. The method set forth in claim 11, wherein when the second mobile terminal is connected to the external apparatus, the second mobile terminal sends information about a memory capacity of the external apparatus to the file handling server and the file handling server determines whether the memory capacity is sufficient to store the file to be transferred.

14. The method set forth in claim 13, wherein the file handling server transmits an error message to the second mobile terminal if the memory capacity is insufficient to store the file to be transferred.

15. The method set forth in claim 13, wherein the file handling server transfers the file to the external apparatus via the second mobile terminal if the memory capacity is sufficient to store the file to be transferred and a current time is not within the set blocking time period.

16. The method set forth in claim 15, wherein the file handling server further transmits a message indicating a file transfer is in progress to the second mobile terminal when the file is being transferred to the external apparatus.

17. The method set forth in claim 10, wherein the blocking time period is set by a user.

18. A method of providing a file transfer service through a mobile communication network, comprising:
   storing, at a file handling server, a data file and transfer conditioning information thereof received from a first mobile terminal connected through the mobile communication network;
   selecting one among the stored data files based on the stored transfer conditioning information; and
   transferring the selected data file from the file handling server to a second mobile terminal specified as a destination of the selected file, wherein the transfer conditioning information includes information of a blocking time period set by a user of when to block a file transfer, wherein said selecting includes selecting one data file whose transfer blocking time period is closest to a current time, and wherein said transferring includes transmitting another data file to a third mobile terminal specified as a destination of another selected data file if the selected data file is not transferred to the second mobile terminal.

19. The method set forth in claim 18, wherein the blocking time period is set by a user.